(12) United States Patent
Gust

(10) Patent No.: US 7,025,245 B2
(45) Date of Patent: Apr. 11, 2006

(54) MAGNETIC WELDER

(76) Inventor: Andrew Charles Gust, 522 Wimbledon Gate North, Torrington, CT (US) 06790

( * ) Notice: Subject to any disclaimer, the term of this patent is extended or adjusted under 35 U.S.C. 154(b) by 224 days.

(21) Appl. No.: 10/458,476

(22) Filed: Jun. 10, 2003

(65) Prior Publication Data

US 2003/0226838 A1    Dec. 11, 2003

Related U.S. Application Data

(60) Provisional application No. 60/387,526, filed on Jun. 10, 2002.

(51) Int. Cl.
*B23K 20/06* (2006.01)
(52) U.S. Cl. ............... 228/107; 228/102; 228/115
(58) Field of Classification Search .......... 228/102, 228/8, 107, 3.1, 115, 234.1, 235.1
See application file for complete search history.

(56) References Cited

U.S. PATENT DOCUMENTS

| | | | | |
|---|---|---|---|---|
| 3,684,150 A | * | 8/1972 | Lemelson | 228/3.1 |
| 5,442,846 A | * | 8/1995 | Snaper | 29/419.2 |
| 5,832,509 A | * | 11/1998 | Mortis et al. | 707/200 |
| 5,981,921 A | | 11/1999 | Yablochnikov | 219/603 |
| 6,137,094 A | * | 10/2000 | Kistersky et al. | 219/672 |
| 6,227,864 B1 | | 5/2001 | Egelandsdal et al. | |
| 6,255,631 B1 | | 7/2001 | Kichline, Jr. et al. | 219/617 |
| 6,273,728 B1 | | 8/2001 | van Meurs et al. | |
| 6,348,670 B1 | | 2/2002 | Kistersky et al. | 219/121.45 |
| 6,379,254 B1 | | 4/2002 | Yablochnikov | 464/134 |
| 6,389,697 B1 | | 5/2002 | Benoit et al. | 29/897.2 |
| 6,400,538 B1 | * | 6/2002 | Kistersky et al. | 361/17 |
| 6,420,686 B1 | | 7/2002 | Benoit et al. | 219/603 |
| 6,452,139 B1 | | 9/2002 | Benoit et al. | 219/617 |
| 6,474,534 B1 | | 11/2002 | Gabbianelli et al. | 228/131 |
| 6,509,555 B1 | | 1/2003 | Riess et al. | 219/633 |
| 6,531,688 B1 | | 3/2003 | Yablochnikov | 219/603 |
| 6,548,791 B1 | * | 4/2003 | Kistersky et al. | 219/617 |
| 6,557,252 B1 | * | 5/2003 | Bennett et al. | 29/868 |
| 6,561,722 B1 | | 5/2003 | Dudko et al. | 403/282 |
| 6,564,605 B1 | | 5/2003 | Gafri et al. | 72/56 |
| 6,875,966 B1 | * | 4/2005 | Barber et al. | 219/616 |
| 2001/0019468 A1 | * | 9/2001 | Kistersky et al. | 361/17 |
| 2002/0074150 A1 | * | 6/2002 | Bennett et al. | 174/74 R |
| 2002/0108946 A1 | * | 8/2002 | Kistersky et al. | 219/617 |
| 2003/0226838 A1 | * | 12/2003 | Gust | 219/617 |

* cited by examiner

Primary Examiner—Jonathan Johnson

(57) ABSTRACT

A magnetic welding and joining device is provided. The device has a separable induction coil that can be selectively coupled to provide an induction coil to be positioned around workpieces that are to be magnetically welded or joined.

20 Claims, 5 Drawing Sheets

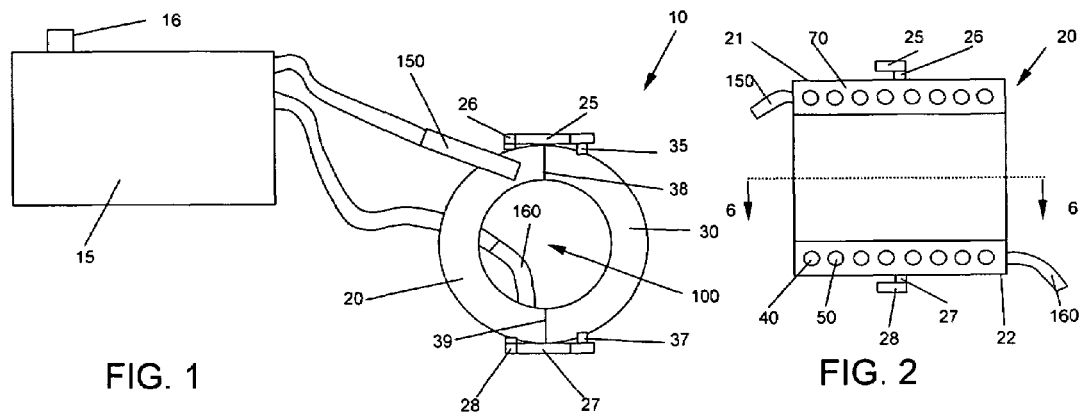
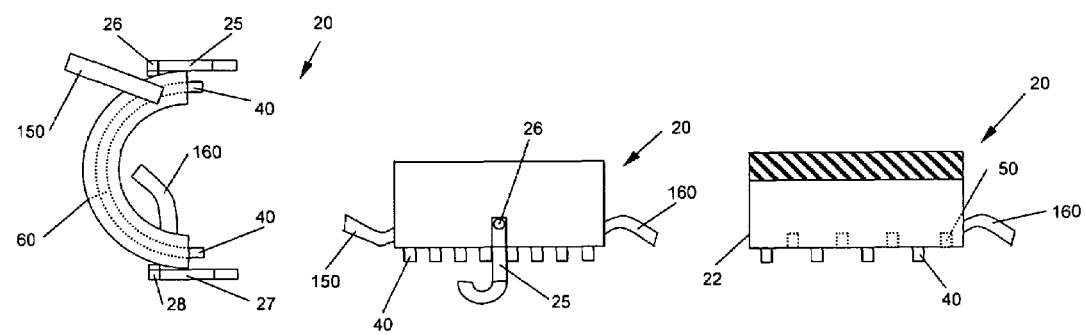
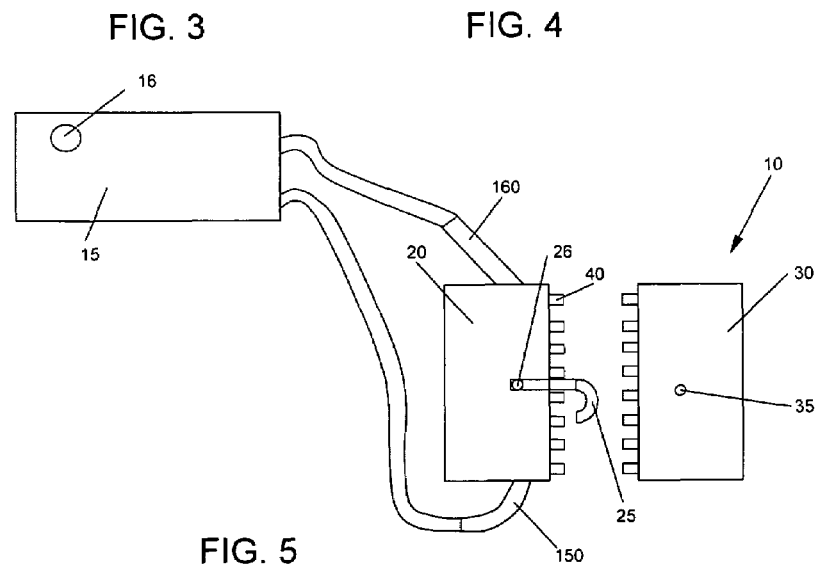

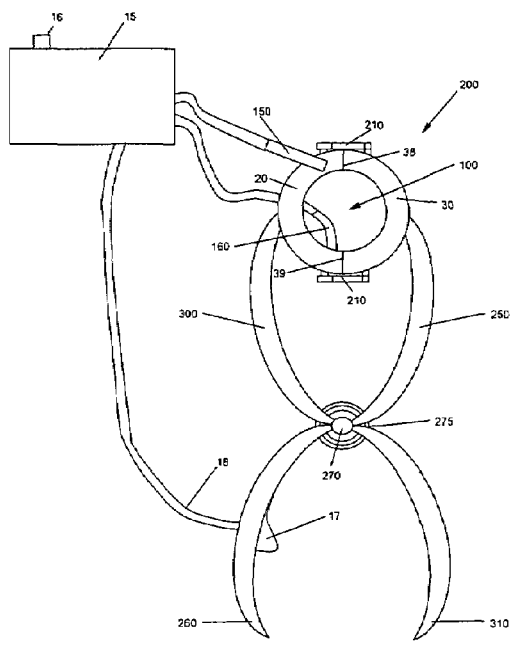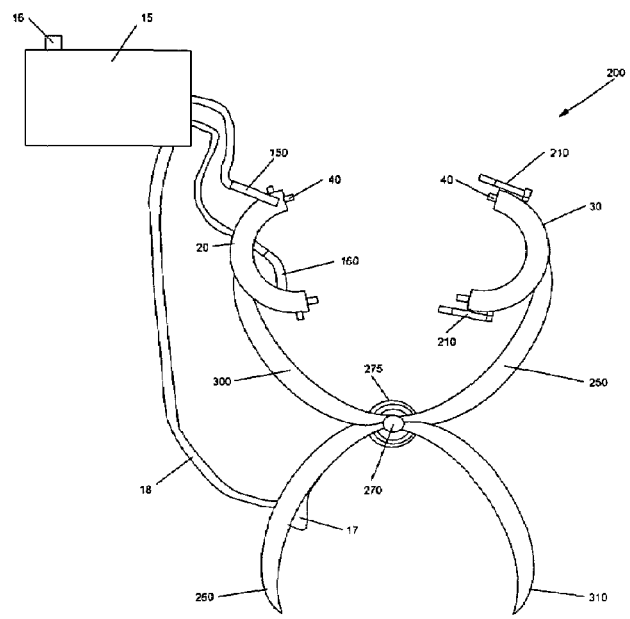
FIG. 7
FIG. 8

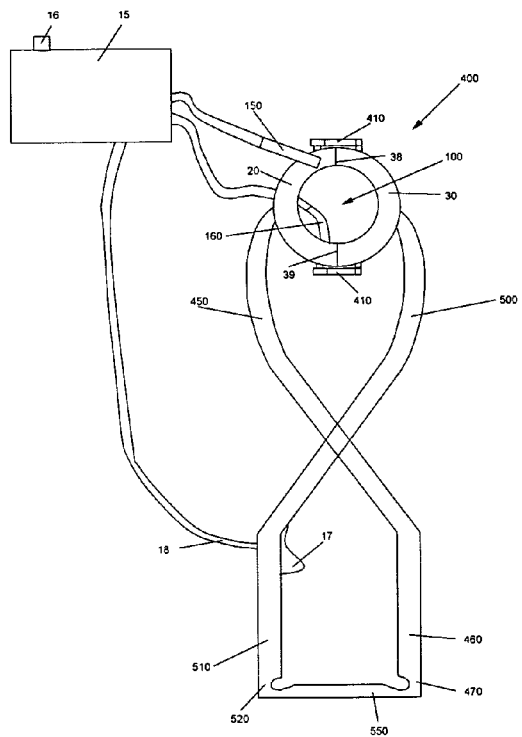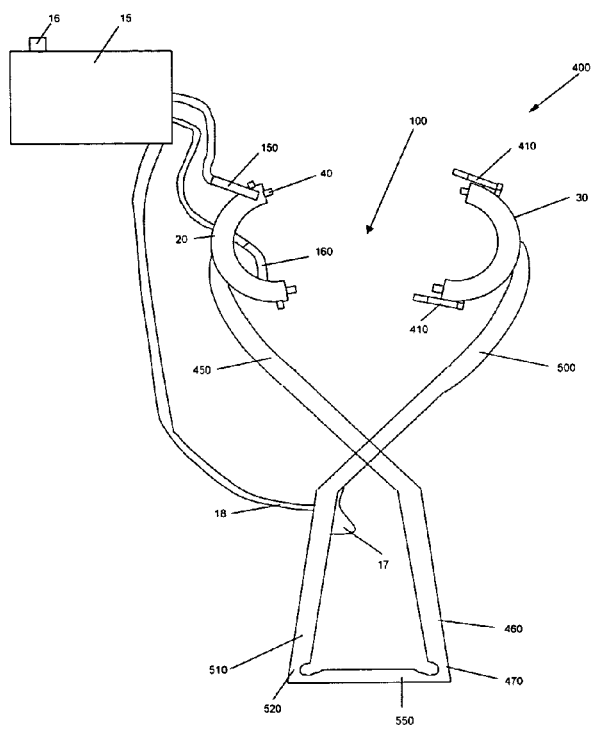
FIG. 9
FIG. 10

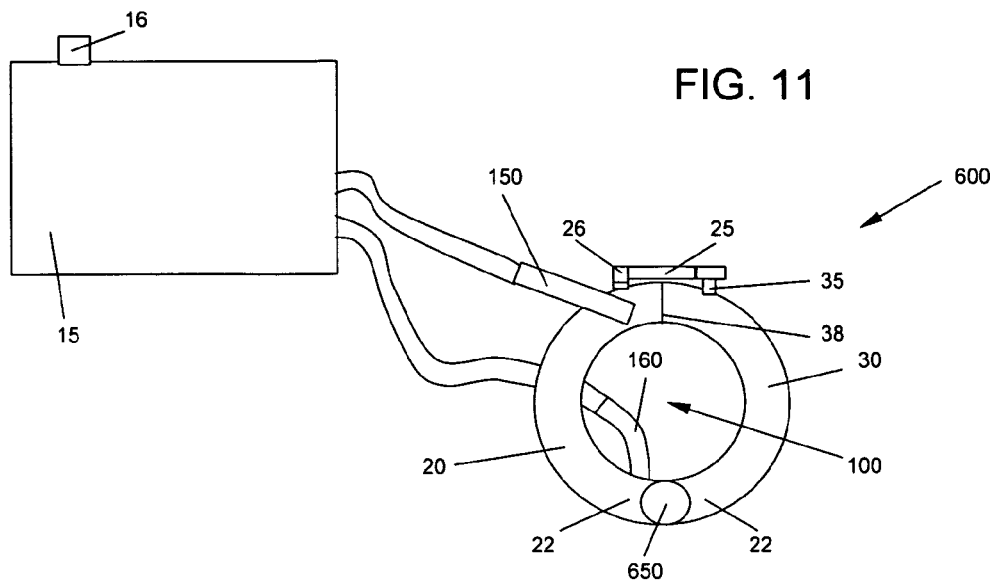
FIG. 11
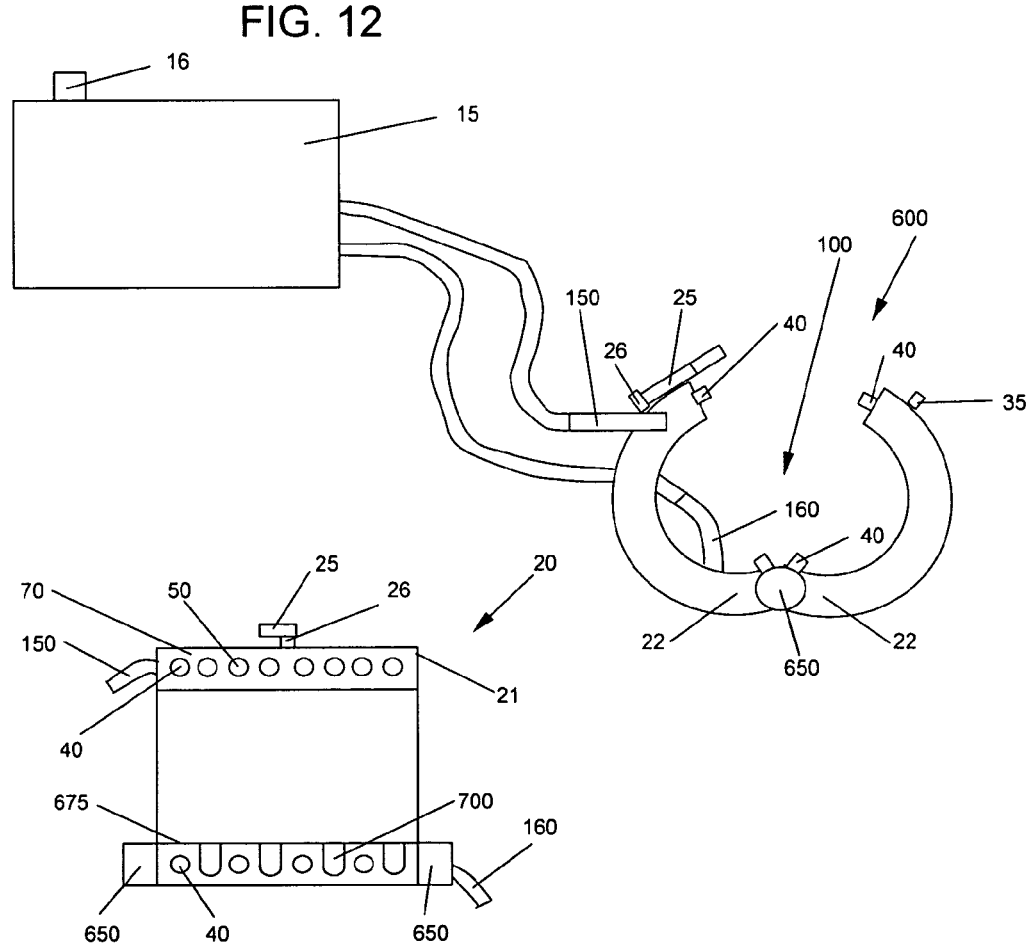
FIG. 12
FIG. 13

MAGNETIC WELDER

RELATED APPLICATION

This application is related to and claims priority in, U.S. Provisional application Ser. No. 60/387,526, filed Jun. 10, 2002, now abandoned the disclosure of which is incorporated herein by reference.

BACKGROUND OF THE INVENTION

1. Field of the Invention

The present invention relates to welding and joining devices. More particularly, the present invention relates to a magnetic pulse welding and joining device.

2. Description of the Prior Art

Welding and joining large workpieces through the use of magnetic pulses is known. The process requires the release of a large amount of energy through an inductor coil that produces a magnetic field within the volume formed by the coil. A first workpiece can be made to move inwardly with a large acceleration and impact a second workpiece through application of the magnetic pulse field created within the inner volume of the inductor coil. If the energy released through the inductor coil is large enough and creates a large enough velocity for the first, outer workpiece, a complete metallurgical bond, i.e., weld, between the two workpieces results. Smaller amounts of energy released through the inductor coil can result in a joining of the two workpieces. The present invention relates to an improved magnetic welding and joining device.

SUMMARY OF THE INVENTION

It is an object of the present invention to provide a magnetic pulse welding and joining device.

It is another object of the present invention to provide such a device that is compact in size.

It is still another object of the present invention to provide such a device that is operable by a single user.

It is a further object of the present invention to provide such a device that is hand-held.

These and other objects and advantages of the present invention are achieved by an apparatus for welding or joining of workpieces comprising a control module and an induction coil. The control module is capable of generating energy sufficient for welding or joining workpieces by a magnetic field. The induction coil is electrically coupled to the control module for generating the magnetic field. The induction coil is selectively separable along at least one portion thereby forming a gap in the induction coil so that the workpieces can pass through the gap and be circumscribed by the induction coil.

In another aspect, an apparatus for welding or joining of workpieces is provided comprising a control module and a hand-held induction coil. The control module is capable of generating energy sufficient for welding or joining the workpieces by a magnetic field. The hand-held induction coil is electrically coupled to the control module for generating the magnetic field. The hand-held induction coil is selectively separable along at least one separation line so that the workpieces can pass through the at least one separation line and be circumscribed by the hand-held induction coil.

In another aspect, a method of magnetically welding or joining workpieces is provided comprising the steps of circumscribing the workpieces with an induction coil by separating the induction coil thereby forming a gap, passing the workpieces through the gap into an inner volume of the induction coil and closing the induction coil thereby eliminating the gap; generating energy sufficient for welding or joining workpieces by a magnetic field; and supplying the energy to the induction coil to generate the magnetic field in the inner volume.

The induction coil can be hand-held. The device can also have a handle operably connected to the induction coil, wherein the handle is electrically insulated from the induction coil. The handle can be operably connected to the induction coil for selectively forming the gap in the induction coil. The induction coil can have a locking mechanism that selectively locks the induction coil in a closed position. The at least one portion can be only partially separable from the induction coil such that the induction coil is a unitary device. The control module can have an adjuster that selectively controls the amount of energy supplied to the induction coil.

The handle can be operably connected to the hand-held induction coil for selectively separating the hand-held induction coil along the at least one separation line. The hand-held induction coil can have a locking mechanism that selectively locks the hand-held induction coil along the at least one separation line. The handle can have a locking actuator operably connected to the locking mechanism for selectively locking the hand-held induction coil along the at least one separation line. The hand-held induction coil can be a unitary device. The control module can have an adjuster that selectively controls the amount of energy supplied to the hand-held induction coil. The control module can indicate a plurality of types of material for the workpieces. The adjuster can be adjusted to one of the plurality of types of material for generating energy sufficient for welding or joining of the one of the plurality of types of material. The handle can have a trigger that allows selective generating of the magnetic field in the hand-held induction coil.

The step of circumscribing the workpieces with the induction coil can include manipulating the induction coil via a handle operably connected to the induction coil, which is electrically insulated from the induction coil. The handle can be is operably connected to the induction coil for selectively forming the gap in the induction coil. The step of supplying the energy to the induction coil to generate the magnetic field in the inner volume can be actuated by a trigger operably connected to the handle.

DESCRIPTION OF THE DRAWINGS

FIG. 1 is a front plan view of a magnetic welding and joining device of the present invention;

FIG. 2 is a side plan view of a portion of the device of FIG. 1;

FIG. 3 is a front plan view of a portion of the device of FIG. 1;

FIG. 4 is a top plan view of a portion of the device of FIG. 1;

FIG. 5 is a separated, top plan view of the device of FIG. 1;

FIG. 6 is a cross-sectional view of a portion of the device taken along line 6—6 of FIG. 2;

FIG. 7 is a front plan view of an alternative embodiment of a magnetic welding and joining device of the present invention;

FIG. 8 is a separated, front plan view of the device of FIG. 7;

FIG. 9 is a front plan view of an alternative embodiment of a magnetic welding and joining device of the present invention;

FIG. 10 is a separated, front plan view of the device of FIG. 9;

FIG. 11 is a front plan view of an alternative embodiment of a magnetic welding and joining device of the present invention;

FIG. 12 is a separated, front plan view of the device of FIG. 11;

FIG. 13 is a side plan view of a portion of the device of FIG. 12;

DETAILED DESCRIPTION OF THE INVENTION

Figure 14:
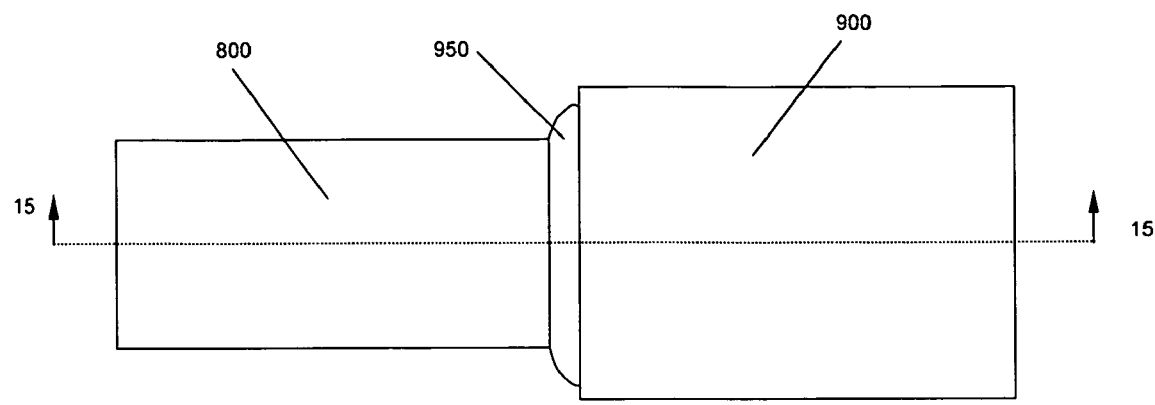
FIG. 14 is a plan view of two separate workpieces of the present invention.

Referring to the figures and, in particular, FIGS. 1 through 3, there is provided a magnetic welding and joining device generally represented by reference numeral 10. Device 10 has first and second portions 20, 30, and is electrically coupled to a power or control module 15.

Control module 15 is capable of providing the requisite level of energy to the device 10, i.e., the induction coil, to produce a magnetic field for magnetic pulse welding of workpieces. The control module 15 can be located at a remote station while device 10 is operable in proximity to the workpieces to be welded or joined. This is especially advantageous where the workpieces are immobile and/or located in difficult to reach areas.

Control module 15 is comprised of electrical components that generate a high level of energy over a short duration of time. Typically, this is done through the use of high-energy capacitors. However, the present disclosure contemplates the use of other types of electrical components and processes for control module 15, which will generate the requisite level of energy for magnetic pulse welding. Preferably, control module 15 has a control adjuster or dial 16. Adjuster 16 allows a user to selectively control the amount of energy supplied to device 10 depending upon the type of material that is to be welded or joined. Preferably, adjuster 10 provides an indication of various types of material so that a user can tune the adjuster accordingly, such as, for example copper to copper.

First and second portions 20, 30 are preferably generally arcuate or semi-cylindrical in shape having the same diameter so as to form a complete cylinder when coupled together. In the exemplary embodiment, two portions 20, 30 are used. However, the present invention includes the use of more than two portions that are manipulable or positionable to form a complete coil, as will be discussed later in greater detail. First and second portions 20, 30 are divided along separation lines 38, 39. The separation lines 38, 39 allow a user to open the device 10 so that access for the workpieces is provided. Of course, the number of separation lines 38, 39 will be dependent upon the number of portions that the induction coil is separated into.

First portion 20 has locking members 25, 27. Locking member 25, 27 are positioned along the outer circumference of first portion 20. Preferably, locking members 25, 27 are diametrically opposed and are centrally located along the circumference of the first portion 20. Locking members 25, 27 are hook-shaped locks that are pivotally connected to first portion 20.

Referring to FIGS. 1 through 6, locking members 25, 27 are aligned with protrusions 35, 37. Locking members 25, 27 and protrusions 35, 37 have a shape that allow releasable engagement of the locking members with the protrusions. In this embodiment, the locking mechanism for first and second portions 20, 30 are by hook and protrusion. However, other methods for securing the portions together may also be utilized including bolt and nut.

First and second portions 20, 30 have a plurality of coil fingers 40 and coil channels 50. Coil fingers 40 extend from first and second portions 20, 30 substantially tangential to the circumference of the first and second portions. Coil fingers 40 are substantially tubular in shape. However, other shapes of coil fingers 40 may also be utilized such as rectangular.

In this exemplary embodiment, first and second portions 20, 30 have four coil fingers 40 extending from an upper region 21 of the first and second portions and four coil fingers 40 extending from a lower region 22 of the first and second portions. The number of coil fingers 40 is dependent upon the number of turns that is used for the induction coil. In this embodiment, a plurality of turns in the induction coil is shown. However, alternatively, a single turn induction coil could also be used.

Coil channels 50 are formed in upper and lower regions 21, 22 and are substantially tangential to the circumference of the upper and lower regions. Coil channels 50 are aligned with and opposite to, coil fingers 40 to provide for a mating engagement of the coil fingers and coil channels. Coil channels 50 are substantially cylindrical in shape and correspond to the shape of coil fingers 40. However, other shapes of coil channels 50 may be utilized that correspond with the shape of coil fingers 40.

In this embodiment, first and second portions 20, 30 have four coil channels 50 extending into upper region 21 and four coil channels 50 extending into lower region 22. The number of coil channels 50 is dependent upon the number of coil fingers 40 and the number of turns that is required for the induction coil.

As shown in FIG. 6, coil fingers 40 and coil channels 50 are alternately positioned along lower region 22 (and alternately positioned along upper region 21). However, other configurations of coil fingers 40 and coil channels 50 may also be used such as positioning coil fingers 40 along upper and lower regions 21, 22 of first portion 20 and positioning coil channels 50 along upper and lower regions 21, 22 of second portion 30.

Coil fingers 40 and coil channels 50 are selectively, releasably engageable to form a complete induction coil. The use of coil fingers 40 and coil channels 50 increases the contact area to facilitate the flow of energy. The releasable engagement of coil fingers 40 and coil channels 50 also reduces the risk of failing to make contact which would result in a short of the induction coil. However, alternative designs may be used to provide for contact between the separable turns of the induction coil such as a flat, surface to surface contact.

Coil fingers 40 and coil channels 50 are connected by coil connectors 60 to form the individual turns of an induction coil. Coil channels 50 and coil connectors 60 can be embedded in a holding structure 70. Preferably, holding structure 70 is rigid to maintain the strength of the induction coil and facilitate manipulation. Holding structure 70 can include electrically insulated material along portions or all of the holding structure that does not conduct electricity, such as, for example, fiberglass or rubber, to prevent accidental electrocution of the user. Coil fingers 40 are releasably engageable with coil channels 50 so that when upper and lower regions 21, 22 of first and second portions 20, 30 are secured, the coil fingers are also surrounded by holding structure 70.

Although the induction coil can be surrounded by insulation in holding structure 70, a magnetic field can still be produced in volume 100. Alternatively, the induction coil can be left exposed or partially exposed, such as, for example, exposing the inner surface of the coil and insulating the outer surface of the coil.

First portion 20 has electric leads 150, 160. Electric leads 150, 160 transfer the energy, i.e., the electric current, from control module 15 to first and second portions 20, 30. In this embodiment, electric leads 150, 160 are connected to the induction coil at upper and lower regions 21, 22 of first portion 20. However, alternative circuit configurations and positionings may also be utilized to provide the requisite current to the induction coil, such as, for example, attaching lead 150 to first portion 20 and attaching lead 160 to second portion 30.

In operation, a user places first portion 20 and second portion 30 around a workpiece. By way of example, the device can be used for welding or joining pipes for plumbing wherein the workpieces would be copper pipes and fittings. The user would place first portion 20 around the circumference of half of the fitting and then place second portion 30 around the opposite half of the fitting. The copper pipe would be the inner workpiece and the fitting would be the outer workpiece.

The user would then secure first portion 20 to second portion 30. This would create the complete induction coil that is necessary for producing the magnetic field in volume 100. Once secured, energy would then be sent from the control module through electric leads 150, 160 and through the induction coil that is created by coil fingers 40, coil channels 50 and coil connectors 60. The flow of energy through the induction coil would create the magnetic field in volume 100 that causes the fitting to accelerate inwardly and collapse upon the copper pipe. A large enough velocity for the fitting (outer workpiece) causes the metal to penetrate the metal of the copper pipe (inner workpiece). This results in a metallurgical bond between the two workpieces. A lower velocity of the fitting will cause the two workpieces to have a tight fit and thus be joined. While the above example describes the welding or joining of tubular copper pipes with fittings, the present invention is not limited to these types of workpieces. The present invention can also be used for welding and joining of other types of workpieces that are made of different materials and are of different shapes than the example provided.

One of the advantages of the present invention over the prior art is that it allows a user to use the device without the assistance of others. Additionally, the separable induction coil facilitates welding of workpieces that are not mobile. Moreover, the device has a compact size. In the example described-above, a user can weld copper pipes that have already been positioned in the walls of a building that could not be welded by an induction coil that was inseparable. The separable induction coil facilitates such welding.

Preferably, device 10 can also hand-held. In the example described above, the control module can be positioned in a remote area while the user welds the copper pipes in the walls throughout the building without the need for moving the control module throughout the building. As a result of using a magnetic welding process that generates little heat, a user reduces the risk of accidental ignition of any flammable items in the area such as insulation or wood that is in the building walls. In plumbing applications, the present invention is a significant advantage over the standard method of soldering copper pipes and fittings because of the need to heat the solder with a torch that poses a flammability risk.

Referring to FIGS. 7 and 8, an alternative embodiment of the present invention is shown and generally represented by reference number 200. Similar to the embodiment shown in FIGS. 1 through 6, device 200 has first and second portions 20, 30 that house a separable induction coil, and is electrically coupled to control module 15. Device 200 is interconnected thereby forming a unitary device.

Device 200 also has a first handle portion 250 and a second handle portion 300. Handle portions 250, 300 have a wave-like shape and are pivotally connected by pivot 270. Pivot 270 is substantially centrally located along handle portions 250, 300. Handle portions 250, 300 have corresponding grip portions 260, 310 for a user to hold and operate device 200. Handle portions 250, 300 are electrically insulated from the induction coil.

Device 200 further has a biasing element 275. In this embodiment, biasing element 275 is a coil spring surrounding pivot 270. Preferably, spring 275 biases handle portions 250, 300 in a closed position, i.e., first portion 20 and second portion 30 are biased together to form a releasable induction coil. In operation, a user can separate grips 260, 310 in order to separate first and second portions 20, 30. The workpieces can then be placed into volume 100 by surrounding the workpieces with first portion 20 and second portion 30. When grips 260, 310 are released, the bias of spring 275 causes first and second portions 20, 30 to be secured together and an induction coil is created. Energy can then be supplied to device 200 to weld or join the work pieces together. Device 200 can also have locking members 210 that are locked after the workpiece is placed into volume 100 so that first and second portions 20, 30 cannot separate when energy is provided. The locking members 210 can be of various known devices including the use of mechanical linkages or arms (not shown) that are mechanically connected to a locking trigger or actuator located on one of the grips 260, 310 to facilitate locking of first and second portions 20, 30 in order to maintain the induction coil in a closed position.

Device 200 preferably has an energy trigger 17 that is electrically connected to control module 15 via wiring 18 for selectively supplying the requisite energy to first and second portions 20, 30 of the induction coil. Trigger 17 can be any of the known triggering devices, such as, for example, a pair of contacts that are selectively, operably connected via a pivot.

Referring to FIGS. 9 and 10, another alternative embodiment of the present invention is shown and generally represented by reference number 400. Similar to the first embodiment shown in FIGS. 1 through 6, device 400 has first and second portions 20, 30 that house a separable induction coil, and is electrically coupled to control module 15. Device 400 is interconnected thereby forming a unitary device.

Device 400 also has a first handle portion 450, a second handle portion 500 and a cross member 550. Handle portions 450, 500 have a wave-like shape and overlap each other at a generally central portion of device 400. Handle portions 450, 500 have corresponding grip portions 460, 510 for a user to hold and operate device 400. First and second handle portions 450, 500 are electrically insulated from the induction coil and preferably include trigger 17 for selectively supplying energy to first and second portions 20, 30.

Handle portions 450, 500 are connected by cross member 550 at connection regions 470, 520. Preferably, connection regions 470, 520 have a diameter that is substantially smaller than the diameter of handle portions 450, 500. The reduced diameter of connection regions 470, 520 provide flexibility to the connection between handle portions 450, 500 and cross member 550. This flexibility facilitates the squeezing of grip portions 460, 510 while providing a bias for the grip portions to return to a substantially parallel position with respect to each other. Alternatively, other biasing mechanisms can be used to allow grip portions 460, 510 to be squeezed together.

In operation, a user can squeeze grips 460, 510 in order to separate first and second portions 20, 30. The workpieces can then be placed into volume 100 by surrounding the workpieces with first portion 20 and second portion 30. When grips 460, 510 are released the bias resulting from connection regions 470, 520 causes grip portions 460, 510 to move away from each other which causes first and second portions 20, 30 to be secured together and an induction coil is created. Energy can then be supplied to device 400 to weld or join the work pieces together. Device 400 can also have locking members 410 that are locked after the workpiece is placed into volume 100 so that first and second portions 20, 30 cannot separate when energy is provided.

Referring to FIGS. 11 through 13, another alternative embodiment of the present invention is shown and generally represented by reference number 600. Similar to the embodiment shown in FIGS. 1 through 6, device 600 has first and second portions 20, 30 that house a separable induction coil, and is electrically coupled to control module 15. Device 600 is interconnected thereby forming a unitary device.

Device 600 has a pivot 650 that pivotally connects first and second portions 20, 30 at lower region 22. By pivotally connecting first and second portions 20, 30, device 600 is a unitary device. By providing a unitary device, the present invention has the advantage of facilitating handling and engagement of first and second portions 20, 30 that are already aligned by pivot 650. Additionally, as described above, while this embodiment is shown with an induction coil having a plurality of turns, the present invention can include an induction coil with a single turn.

Along upper region 21, device 600 uses coil fingers 40 and coil channels 50 to connect the individual turns of the induction coil at the upper region (see FIG. 6). As a result of the pivotal connection of first and second portions 20, 30 at lower region 22, device 600 uses coil fingers 40 and coil slots 700 to connect the individual turns of the induction coil at the lower region. Coil slots 700 are open to inner surface 675 of first portion 20. This allows coil fingers 40 to pivot into coil slots 700.

In operation, a user places first portion 20 and second portion 30 around workpieces by placing the workpieces into volume 100 when the first and second portions are separated along separation lines 38, 39. In the example cited above for welding or joining copper pipes and fittings, the user would place first portion 20 around the circumference of half of the fitting and then place second portion 30 around the opposite half of the fitting. The copper pipe would be the inner workpiece and the fitting would be the outer workpiece.

The user would then secure first portion 20 to second portion 30 using locking member 25. This would create the complete induction coil that is necessary for producing the magnetic field in volume 100. Securing of first and second portions 20, 30 is facilitated by pivot 650 that aligns the first and second portions. Once secured, energy would then be sent from the control module through electric leads 150, 160 and through the induction coil that is created by coil fingers 40, coil channels 50, coil slots 700 and coil connectors 60. The flow of energy through the induction coil would create the magnetic field in volume 100 that causes the fitting to accelerate inwardly and collapse upon the copper pipe.

Figure 15:
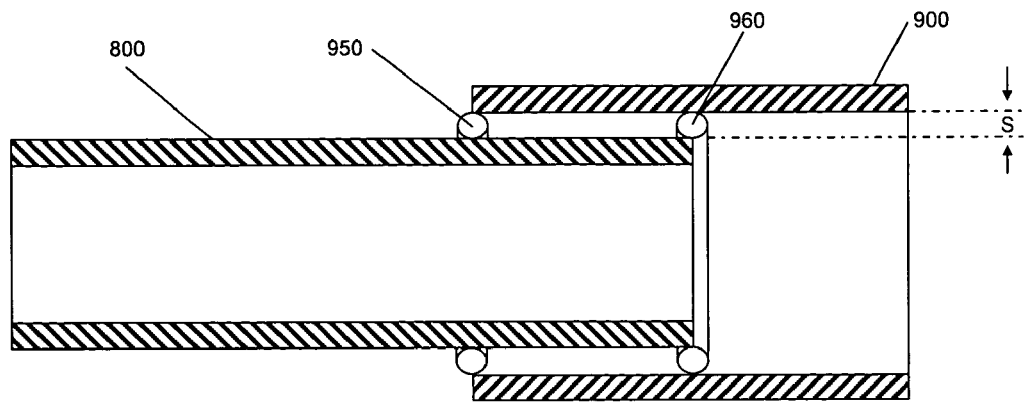
FIG. 15 is a cross-sectional view of the separate workpieces taken along line 15—15 of FIG. 14.
Figure 16:
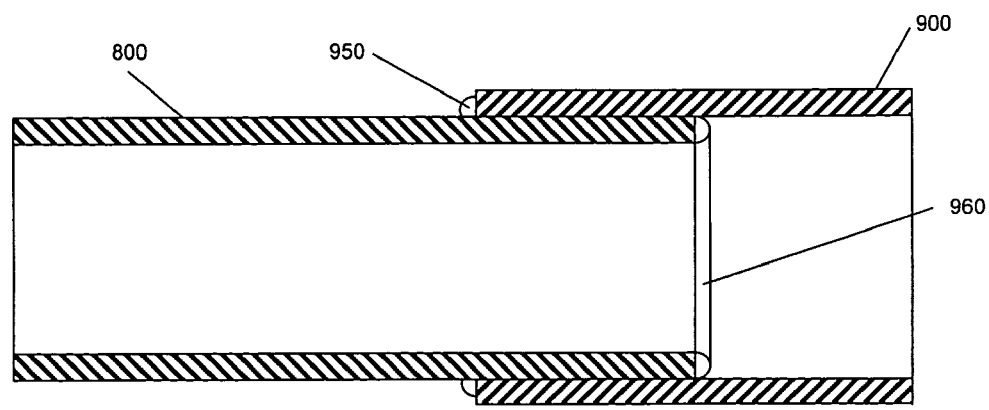
FIG. 16 is a cross-sectional view of the welded workpieces taken along line 15—15 of FIG. 14.

Referring to FIGS. 14 through 16, by way of example, first and second workpieces 800, 900 are shown. First and second workpieces 800, 900 are tubular members that are to be welded or joined. First workpiece 800 has an outer diameter that is smaller than the inner diameter of second workpiece 900 so that the first workpiece can partially slide in the second workpiece.

In order to allow a magnetic field to accelerate an outer workpiece to a sufficient velocity for achieving a full metallurgical bond upon impact with an inner workpiece, there should preferably be a spacing between the inner and outer workpieces.

Referring to FIG. 15, the spacing between the outer diameter of first workpiece 800 and inner diameter of second workpiece 900 is S. Second workpiece 900 has an outer spacer 950 and an inner spacer 960. Preferably, outer and inner spacers 950, 960 are o-rings. More preferably, spacers 950, 960 have a circumferential width equal to S. Although spacers 950, 960 are shown as a complete ring, alternative types of spacers can be used including a plurality of spaced apart projections.

As shown in FIG. 15, spacers 950, 960 separate first and second workpieces 800, 900 the requisite distance for achieving the necessary velocity at impact. Preferably, spacers 950, 960 are made of a soft material such as silicone that has the strength to separate first and second workpieces 800, 900 but the flexibility to deform when the second workpiece is collapsed around the first workpiece. Additionally, preferably spacers 950, 960 have a high enough coefficient of friction so that they retain their position in second workpiece 900 when first workpiece 800 is inserted therein. Alternatively, spacers 950, 960 can be retained in their position in second workpiece 900 by other means including grooves formed in the inner surface of the second workpiece.

As shown in FIG. 16, after second workpiece 900 has been collapsed around first workpiece 800, spacers 950, 960 are deformed to form a sealing engagement at the point of contact between the inner surface of the second workpiece and the outer surface of the first workpiece. This sealing engagement has the advantage of ensuring a sealing fit between first and second workpieces 800, 900 in the event that a full metallurgical bond has not been achieved. Additionally, the deformation of outer spacer 950 is visible to a user so that the user is assured that second workpiece 900 has been collapsed around first workpiece 800.

Although the present invention shows spacers 950, 960 as separate members from second workpiece 900, the spacers can be integrally formed with the second workpiece or the first workpiece, such as one or more indentations, annular or otherwise, on the inner surface of the second workpiece or one or more indentations, annular or otherwise, on the outer surface of the first workpiece.

While the instant disclosure has been described with reference to one or more exemplary embodiments, it will be understood by those skilled in the art that various changes may be made and equivalents may be substituted for elements thereof without departing from the scope thereof. In addition, many modifications may be made to adapt a particular situation or material to the teachings of the disclosure without departing from the scope thereof. Therefore, it is intended that the disclosure not be limited to the particular embodiment(s) disclosed as the best mode contemplated for carrying out this invention, but that the invention will include all embodiments falling within the scope of the appended claims.

What is claimed is:

1. An apparatus for welding or joining of workpieces comprising:
   a control module capable of generating energy sufficient for welding or joining workpieces by a magnetic field;
   an induction coil electrically coupled to said control module for generating said magnetic field, wherein said induction coil is selectively separable along at least one portion thereby forming a gap in said induction coil so that the workpieces can pass through said gap and be circumscribed by said induction coil, wherein said induction coil is hand-held; and
   a handle operably connected to said induction coil, wherein said handle is electrically insulated from said induction coil.

2. The apparatus of claim 1, wherein said handle is operably connected to said induction coil for selectively forming said gap in said induction coil.

3. The apparatus of claim 1, wherein said induction coil has a locking mechanism that selectively locks said induction coil in a closed position.

4. The apparatus of claim 1, wherein said at least one portion can be only partially separated from said induction coil such that said induction coil is a unitary device.

5. The apparatus of claim 1, wherein said control module has an adjuster that selectively controls the amount of energy supplied to said induction coil.

6. An apparatus for welding or joining of workpieces comprising:
   a control module capable of generating energy sufficient for welding or joining the workpieces by a magnetic field;
   a hand-held induction coil electrically coupled to said control module for generating said magnetic field, wherein said hand-held induction coil is selectively separable along at least one separation line so that the workpieces can pass through said at least one separation line and be circumscribed by said hand-held induction coil; and
   a handle operably connected to said hand-held induction coil, wherein said handle is electrically insulated from said hand-held induction coil.

7. The apparatus of claim 6 wherein said handle is operably connected to said hand-held induction coil for selectively separating said hand-held induction coil along said at least one separation line.

8. The apparatus of claim 7, wherein said hand-held induction coil has a locking mechanism that selectively locks said hand-held induction coil along said at least one separation line.

9. The apparatus of claim 8, wherein said handle has a locking actuator operably connected to said locking mechanism for selectively locking said hand-held induction coil along said at least one separation line.

10. The apparatus of claim 6, wherein said hand-held induction coil is a unitary device.

11. The apparatus of claim 6, wherein said control module has an adjuster that selectively controls the amount of energy supplied to said hand-held induction coil.

12. The apparatus of claim 11, wherein said control module indicates a plurality of types of material for the workpieces, and wherein said adjuster can be adjusted to one of said plurality of types of material for generating energy sufficient for welding or joining of said one of said plurality of types of material.

13. The apparatus of claim 6, wherein said handle has a trigger that allows selective generating of said magnetic field in said hand-held induction coil.

14. A method of magnetically welding or joining workpieces comprising:
   circumscribing the workpieces with an induction coil by separating said induction coil thereby forming a gap, passing the workpieces through said gap into an inner volume of said induction coil and closing said induction coil thereby eliminating said gap;
   generating energy sufficient for welding or joining workpieces by a magnetic field; and
   supplying said energy to said induction coil to generate said magnetic field in said inner volume, wherein circumscribing workpieces with said induction coil comprises manipulating said induction coil via a handle operably connected to said induction coil and electrically insulated from said induction coil.

15. The method of claim 14, wherein said handle is operably connected to said induction coil for selectively forming said gap in said induction coil.

16. The method of claim 14, wherein the step of supplying said energy to said induction coil to generate said magnetic field in said inner volume is actuated by a trigger operably connected to said handle.

17. The method of claim 14, further comprising:
   providing a spacing between the workpieces thereby allowing the magnetic field to accelerate the workpieces to a sufficient velocity for welding or joining.

18. The method of claim 17, wherein the spacing is provided via one or more spacers that are separate from the workpieces.

19. The method of claim 17, wherein the spacing is provided via one or more spacers that are integrally formed with one or more of the workpieces.

20. The method of claim 17, wherein the spacing provided between the workpieces and the energy generated causes a substantially complete metallurgical bond between the workpieces.

* * * * *